United States Patent [19]
Kotsch et al.

[11] Patent Number: 4,737,610
[45] Date of Patent: Apr. 12, 1988

[54] METHOD AND APPARATUS FOR THE DESORPTION OF AN ADSORPTION AGENT THAT IS LOADED WITH NOXIOUS MATERIAL

[75] Inventors: Herbert Kotsch, Heusenstamm; Gernot Krauss, Wiesbaden, both of Fed. Rep. of Germany

[73] Assignee: Hugo Petersen Gesellschaft für verfahrenstechnischen Anlagenbau mbH & Co. KG, Wiesbaden, Fed. Rep. of Germany

[21] Appl. No.: 845,934

[22] Filed: Mar. 28, 1986

[30] Foreign Application Priority Data

Mar. 30, 1985 [DE] Fed. Rep. of Germany ....... 3511766

[51] Int. Cl.⁴ .............................................. H05B 6/78
[52] U.S. Cl. ...................... 219/10.55 M; 219/10.55 R; 219/10.55 A
[58] Field of Search ................ 219/10.55 M, 10.55 R, 219/10.55 A, 10.55 E

[56] References Cited

U.S. PATENT DOCUMENTS

| | | | |
|---|---|---|---|
| 2,585,970 | 2/1952 | Shaw | 219/10.55 R |
| 4,280,033 | 7/1981 | Wagener et al. | 219/10.55 A |
| 4,326,114 | 4/1982 | Gerling et al. | 219/10.55 A |
| 4,364,859 | 12/1982 | Ohtsuka et al. | 219/10.55 M |
| 4,398,076 | 8/1983 | Hanson | 219/10.55 A |
| 4,459,450 | 7/1984 | Tyler et al. | 219/10.55 M |

*Primary Examiner*—Robert S. Macon
*Attorney, Agent, or Firm*—Becker & Becker, Inc.

[57] ABSTRACT

A method and apparatus for desorbing a granular carbonaceous adsorption agent that is loaded with noxious materials, and in particular for desorbing activated coke loaded with sulfur oxides and/or nitrogen oxides from flue gases. The adsorption agent is heated to the desorption temperature by subjecting the granules of the agent to radiation which is absorbed directly by the granules, thereby releasing gaseous noxious materials from the desorption agent. The released desorbed gaseous noxious materials are collected, and the desorbed adsorption agent is cooled.

11 Claims, 1 Drawing Sheet

METHOD AND APPARATUS FOR THE DESORPTION OF AN ADSORPTION AGENT THAT IS LOADED WITH NOXIOUS MATERIAL

BACKGROUND OF THE INVENTION

1. Field of the Invention

The present invention relates to a method of desorbing a granular carbonaceous adsorption agent that is loaded with noxious materials or other harmful substances, and in particular relates to a method of desorbing activated coke that is loaded with sulfur oxides and/or nitrogen oxides from flue gases. The present invention also relates to an apparatus for carrying out such a method.

2. Description of the Prior Art

A method is known from a German research report of the Federal Ministry for Research and Technology (BMFT-FB-T-81-147) according to which a tubular desorber is used for regenerating activated coke that was loaded with noxious materials in a flue gas desulfurization plant. In the desorber, the activated coke is regenerated by being heated to temperatures of between 305°–500° C. In this connection, the desorber acts as a gas-solid heat exchanger, since the heat of a hot gas that enters the heat exchanger is transmitted via the walls of the tubes to the solid coke that flows through the tubes. Since the heat transfer is effected through the walls of the tubes, the temperatures of the hot gas and of the tube walls must be significantly greater than the desorption temperature. Since the tubes are exposed to the corrosive desorbed gases, it is necessary at the required high temperatures to impose high requirements for the material used for the tubular absorber, at least in the preliminary heating zone of the desorber. In a high temperature zone that follows the preliminary heating zone, rich gas is recirculated through a free fill in order to heat the activated coke to the required temperature. From the fill, the activated coke is introduced into tubes where it is subjected to a cooling that is effected by air via indirect cooling of the activated coke that flows in the tubes.

An object of the present invention is to provide a method according to which, during heating of the adsorption agent, lesser requirements are imposed for the materials used in the heating zone for guiding the adsorption agent.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

Figure 1:
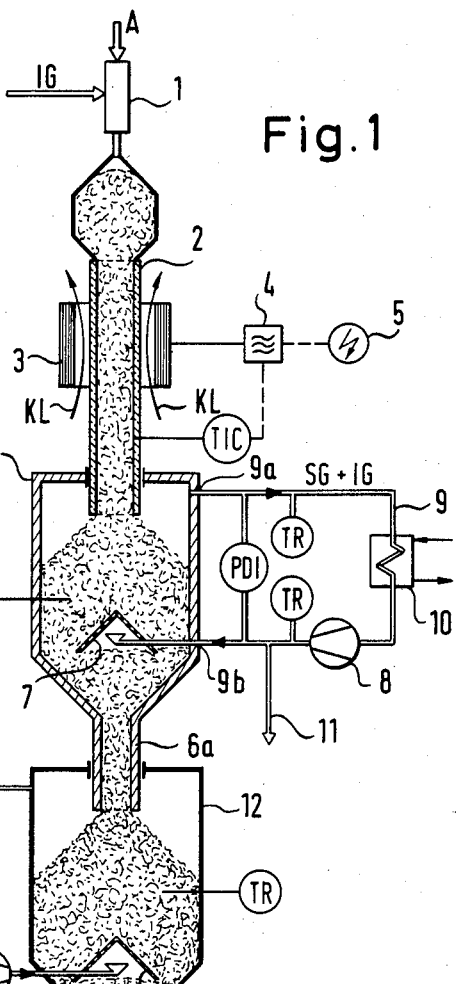
FIG. 1 is a view that shows a first exemplary embodiment of an apparatus for carrying ou the method of the present invention, with the adsorption agent being conveyed through a conduit.

The invention method of desorbing a granular carbonaceous adsorption agent includes the steps of: heating the adsorption agent to the desorption temperature by subjecting the granules of the agent to radiation which is adsorbed directly by the granules, thereby releasing gaseous noxious materials from the adsorption agent; collecting the released desorbed gaseous noxious materials; and cooling the desorbed adsorption agent.

Preferred carbonaceous adsorption agents include anthracite, activated coke, petroleum coke, and/or activated coal.

Preferably, a radiation is used that to a substantial extent is absorbed by the granules of the adsorption agent. For this reason, in addition to infrared radiation, the radiation is preferably a dielectric heating process via microwaves. The adsorption material can be conveyed in an enclosure that is permeable to microwaves. Preferably, the material is conveyed directly through a hollow resonator into which the microwave energy is fed.

On the whole, a heating range of from 80°–700° C. is contemplated; for the adsorption of $SO_x$, the heating ranges from 450°–700° C., whereas for desorbing $NO_x$, a temperature of 80°–150° C. is sufficient. Examples of carbonaceous adsorption material include anthracite, activated coke, petroleum coke, and/or activated coal, with activated coke being preferred.

The desorbed gaseous noxious materials are preferably driven out of the adsorption agent, which is heated via the radiation, by means of a circulated stream of inert gas, such as $N_2$. The desorbed gaseous noxious materials are then withdrawn from this circulation in concentrated form with inert gas.

It is further preferred that the circulated inert gas stream be additionally heated with the gaseous noxious materials that are driven out. This heating can be effected, for example, via a gas-gas heat exchanger.

From the aforementioned literature, it is known that the adsorption agent from which the gaseous noxious materials are driven out is cooled. As already mentioned, the cooling is effected indirectly by conveying the adsorption agent through tubes. With the inventive procedure for carrying out the method, it is preferred to directly cool the adsorption agent with inert gas after the noxious materials have been driven out. This increases the effectiveness of the cooling. The heat withdrawn via the cooling can advantageously be used for other purposes.

Since inert gas is used not only during introduction of the adsorption agent that is to be desorbed, but also for the cooling, it is expedient that the inert gas flow into the desorption zone, or into the cooling zone, in a countercurrent manner, so that the inert gas can flow countercurrent into the rich-gas-withdrawal zone, and can be accepted into the expulsion circulation.

In summary, it can be said that by heating an adsorption agent in the heating and desorption zone via radiation, the materials used for guiding the adsorption agent in the unit can be of an appropriately lower grade than are the materials used with the apparatus known up to now.

The present invention is also directed to an apparatus for carrying out the inventive method. As with the apparatus of the state of the art, the inventive apparatus is provided with a heating mechanism, with a desorption gas collector disposed therebelow, and with a cooler that is disposed below the collector.

In particular, the apparatus of the present invention is characterized primarily in that the heating unit includes at least one radiation-emitting device, the radiation of which is absorbed by the granules of the adsorption agent to thereby release gaseous noxious materials from the latter. In this connection, it is possible to provide a plurality of individual radiation-emitting devices, or an appropriately larger antenna. Preferably, the radiation-emitting device is a microwave emitter.

Pursuant to a preferred embodiment of the present invention, inert gas can be supplied to that end of the heating unit to which loaded adsorption agent is fed, and to the lower end of the cooling zone, from which the desorbed adsorption agent is withdrawn. This assures that leakage of the desorption gas out of the desorption gas collector in the direction of supply of loaded adsorption agent cannot occur during withdrawal of the desorbed adsorption agent.

It is also preferred to provide both the desorption gas collector and the cooler with a respective circulation of inert gas and desorption gas on the one hand, and inert gas as cooling gas on the other hand.

Further specific features of the present invention will be described subsequently.

DESCRIPTION OF THE PREFERRED EMBODIMENTS

Referring now to the drawing in detail, in the embodiment illustrated in FIG. 1, activated coke A that is loaded with noxious material or harmful substances, and that is to be regenerated, is metered into the regenerating unit via a dosing and closure unit 1. The activated coke A enters a conduit 2, for example of quartz glass, that is permeable for microwaves and is resistant to the desorbed gaseous noxious materials. The conduit 2 is surrounded by an annular microwave antenna 3 that is spaced from the conduit 2. A microwave emitter 4, which is connected with a power source 5, energizes the antenna 3 in such a way that, for example where the noxious material is essentially $SO_2$, the activated coke A is heated to a temperature in the range of from 450°–700° C. To protect the annular antenna 3, the latter is spaced from the surface of the conduit 2 in order to enable the passage of freely flowing or forced cooling air KL.

As illustrated in FIG. 1, the temperature is determined at the conduit 2, and the output capacity of the emitter 4 is regulated as a function of this temperature (TIC).

The activated coke A exits the lower end of the conduit 2 and enters a desorption gas collector 6, where it builds up a free fill above a perforated conical plate 7.

By means of a blower 8 and a line 9, a mixture of desorbed noxious material gases (in the case of scrubbing of flue gases: $SO_2$, HF, HCL, $NO_x$) and inert gas IG are withdrawn from the space above the fill of the activated coke A in the desorption gas collector 6. This mixture SG+IG is again blown into the fill below the conical plate 7. The introduction of inert gas IG into the unit will be explained subsequently. If necessary, a preliminary and/or support heating unit 10, for example a gas-gas or gas-vapor heat exchanger, is provided in the line 9 in order to shorten the starting time of the unit or, in individual cases, to aid in heating the activated coke.

A portion or partial stream of the gas SG+IG that is flowing in line 9 and that is concentrated with the noxious gases SG is drawn off from the line 9 via a branch line 11, and, in a known manner, is fed to a non-illustrated rich gas recovery plant. In other words, where $SO_2$ predominates, the gas is fed to a contact unit for producing $H_2SO_4$.

As can be seen from FIG. 1, the temperatures are determined in the line 9 ahead of the heating unit 10, and are determined on the pressure side of the blower 8 or in the fill in the desorption gas collector 6, which is preferably lined with brick. These temperatures are registered (TR) in the control room of the unit. In addition, a pressure differential (PDI) is measured between the gas outlet 9a and the gas inlet 9b of the line 9.

The activated coke A, which has essentially been freed of desorption gas, enters via an outlet connector 6a into a cooler 12 disposed below the collector 6; this cooler is similarly provided with a perforated conical plate 7. By means of a blower 13 and a line 14, cooling gas is conveyed countercurrent through the fill of the cooler 12. To cool the cooling gas, a heat exchanger 15, for example a gas-water heat exchanger, is disposed in the line 14. The temperature in the fill is determined and registered (TR), and the temperature is measured (TI) in the line 14 ahead of and after the heat exchanger 15.

The activated coke A is withdrawn from the cooler 12 via a dosing and closure unit 16.

Inert gas IG, for example $N_2$, is introduced into the unit via the units 1 and 16. It is possible, for example, to construct the dosing and closure units of two successively arranged rotary traps, and to introduce the inert gas between the two traps. From the dosing enclosure units, the inert gas flows countercurrent into the unit 1, serving in particular as cooling gas in the cooler 12, and as circulating gas for the desorption gas collector 6. In conformity with the supply of inert gas, and the quantity of desorbed gas, a portion of the inert gas is continuously withdrawn via the branch line 11.

The cooler does not have to be lined with brick, nor does it have to be protected in some other way from the noxious gases, since the leakage of noxious gas out of the desorption gas collector 6 into the cooler 12 is nearly entirely avoided, or at least kept very slight, by the activated coke in the connector 6a and by the countercurrent flow of inert gas.

In place of the single conduit 2, a plurality of conduits, disposed, for example, in rows, could also be provided in conformity with the quantity that is to be conveyed and/or with the depth of penetration that can be achieved by the microwaves into the activated coke. These conduits are supplied with activated coke, and open into the desorption gas collector 6.

The heat withdrawn with the inert gas IG from the cooler 12 via the heat exchanger 15 can be used for many purposes.

Figure 2:
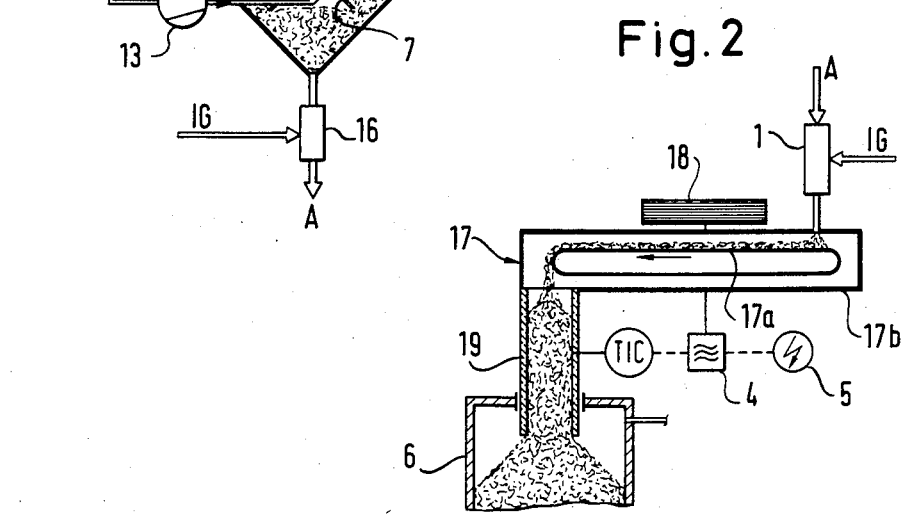
FIG. 2 is a view that shows a second exemplary embodiment of an inventive apparatus, where the adsorption agent is conveyed through a conveying mechanism.

Whereas with the embodiment of FIG. 1 a stream of activated coke that moves through one or more conduits is heated, with the embodiment shown in FIG. 2 a conveying mechanism 17, which includes a conveying element 17a and a housing 17b that surrounds the conveying element in an airtight manner, is connected downstream of the dosing and closure unit 1 as a heating and desorption zone. The mechanism 17 conveys the coke in a fill disposed below an elongated microwave antenna 18. The conveying mechanism 17 can, for example, be a conveyor belt upon which the activated coke is moved in the form of a flat fill. The heated coke drops via a drop chute 19 into the desorption gas collector 6. Examples of different conveying mechanisms include worm conveyors and vibratory chutes. As with the embodiment having the conduit 2, it is also possible with this embodiment, which is provided with conveying mechanisms, to have one or more conveying mechanisms that have associated therewith microwave antennas or other emitters.

Material can be conveyed through the conduit 2, or the conveying mechanism 17, either continuously (as shown in the illustrated embodiments) or as a batch process. In either case, supply and withdrawal is achieved by appropriately controlled dosing and closure units 1 and 16. It is also possible to use other than the illustrated microwave antenna forms. For example, the housing 17*b* can be embodied as a tubular microwave guide in which microwaves from a microwave emitter are bunched.

The present invention is, of course, in no way restricted to the specific disclosure of the specification and drawing, but also encompasses any modifications within the scope of the appended claims.

What is claimed is:

1. A method of desorbing a granular carbonaceous adsorption agent that is loaded with noxious materials, said method including the steps of:
   heating said loaded adsorption agent to the desorption temperature by subjecting the granules of said adsorption agent to radiation, which is absorbed directly by said granules, thereby releasing gaseous noxious materials from said adsorption agent;
   collecting the released desorbed gaseous noxious materials; and
   cooling the desorbed adsorption agent.

2. A method according to claim 1, in which said heating step includes radiating said granules of said adsorption agent with microwaves.

3. A method according to claim 1, in which said collecting step includes driving released desorbed gaseous noxious materials out of said adsorption agent, which has been heated via radiation, by means of a circulated stream of inert gas; and which includes the step of withdrawing from said circulation desorbed gaseous noxious materials in concentrated form with inert gas.

4. A method according to claim 3, in which said inert gas is $N_2$.

5. A method according to claim 3, which includes the step of additionally heating said circulated inert gas stream with driven-out gaseous noxious material.

6. A method according to claim 3, which includes the step of directly cooling desorbed adsorption agent with inert gas after said noxious materials have been driven out of said adsorption agent.

7. A method according to claim 3, which includes the step of introducing inert gas into the desorption and cooling zones countercurrent to the direction of movement of said adsorption agent.

8. A apparatus for desorbing a granular carbonaceous adsorption agent that is loaded with noxious materials, said apparatus comprising:
   a heating unit that includes at least one radiation-emitting device, the radiation of which is adsorbed by the granules of said adsorption agent to thereby release gaseous noxious materials from the latter;
   a desorption gas collector disposed below said radiation-emitting device for collecting released gaseous noxious materials; and
   a cooler disposed below said desorption gas collector.

9. An apparatus according to claim 8, in which said radiation-emitting device is a microwave emitter.

10. An apparatus according to claim 8, in which said heating unit has an end to which said loaded adsorption agent is fed, with inert gas being supplied to this end; and in which said cooler has an end from which desorbed adsorption agent is withdrawn, with inert gas being supplied to this end.

11. An apparatus according to claim 10, in which a circulation of inert gas and desorption gas is provided for said gas collector, and a circulation of inert gas, as cooling gas, is provided for said cooler.

* * * * *

UNITED STATES PATENT AND TRADEMARK OFFICE
CERTIFICATE OF CORRECTION

PATENT NO. : 4,737,610
DATED : Apr. 12, 1988
INVENTOR(S) : Herbert Kotsch and Gernot Krauss It is certified that error appears in the above-identified patent and that said Letters Patent is hereby corrected as shown below:

On the Title-Abstract page, the following should be cancelled:

" [73] Assignee: Hugo Petersen Gesellschaft für verfahrenstechnischen Anlagenbau mbH & Co. KG, Wiesbaden, Fed. Rep. of Germany"

Signed and Sealed this

Sixteenth Day of August, 1988

*Attest:*

DONALD J. QUIGG

*Attesting Officer*    *Commissioner of Patents and Trademarks*